United States Patent
Dhanwada et al.

(10) Patent No.: US 11,301,600 B2
(45) Date of Patent: *Apr. 12, 2022

(54) METHODS FOR GENERATING A CONTRIBUTOR-BASED POWER ABSTRACT FOR A DEVICE

(71) Applicant: International Business Machines Corporation, Armonk, NY (US)

(72) Inventors: Nagashyamala R. Dhanwada, Tenafly, NJ (US); William W. Dungan, Wappingers Falls, NY (US); David J. Hathaway, Underhill Center, VT (US); Arun Joseph, Bangalore (IN); Gaurav Mittal, Round Rock, TX (US); Ricardo H. Nigaglioni, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/534,453

(22) Filed: Aug. 7, 2019

(65) Prior Publication Data

US 2019/0362040 A1 Nov. 28, 2019

Related U.S. Application Data

(63) Continuation of application No. 14/788,859, filed on Jul. 1, 2015, now Pat. No. 10,460,048.

(51) Int. Cl.
*G06F 30/20* (2020.01)

(52) U.S. Cl.
CPC ................. *G06F 30/20* (2020.01)

(58) Field of Classification Search
CPC .......... G06F 30/20; G06F 30/30; G06F 30/31; G06F 30/32; G06F 30/323; G06F 30/327
See application file for complete search history.

(56) References Cited

U.S. PATENT DOCUMENTS

| | | | | |
|---|---|---|---|---|
| 5,668,732 A | * | 9/1997 | Khouja | G06F 30/33 702/60 |
| 6,434,704 B1 | * | 8/2002 | Dean | G06F 30/30 713/320 |

(Continued)

OTHER PUBLICATIONS

Dhanwada, Nagu, David Hathaway, Victor Zyuban, Peng Peng, Karl Moody, William Dungan, Arun Joseph, Rahul Rao, and Christopher Gonzalez. "Efficient PVT independent abstraction of large IP blocks for hierarchical power analysis." In 2013 IEEE/ACM International Conference on Computer-Aided Design (Year: 2013).*

(Continued)

*Primary Examiner* — Chuen-Meei Gan
(74) *Attorney, Agent, or Firm* — Samuel Waldbaum (57) ABSTRACT

Generating a contributor-based power abstract for a device, including: identifying a clock power component for each of a plurality of clock gating domains, identifying a switching characteristic for each of the clock gating domains, combining the switching characteristics for all of the clock gating domains into a domain combination list, performing a per-case simulation based at least on the domain combination list, calculating an effective capacitance for each of the clock gating domains based at least on the per-case simulation, and generating a power abstract for each of the clock gating domains based at least on the effective capacitance.

17 Claims, 4 Drawing Sheets

(56) References Cited

U.S. PATENT DOCUMENTS 6,536,024 B1* 3/2003 Hathaway .............. G06F 1/10
327/295
2015/0006142 A1* 1/2015 Dhanwada ............ G06F 30/367
703/21
2017/0004234 A1 1/2017 Dhanwada et al.

OTHER PUBLICATIONS

Huda, Safeen, Muntasir Mallick, and Jason H. Anderson. "Clock gating architectures for FPGA power reduction." In 2009 International Conference on Field Programmable Logic and Applications, pp. 112-118. IEEE, 2009. (Year: 2009).*

Huda et al., *Clock Gating ArchitecturesFor FPGA Power Reduction*, IEEE Xplore, «http://janders.eecg.toronto.edu/pdfs/paper.pdf», 2009, 7 pages.

Kaushik et al., *Dynamic Power Reduction of Digital Circuits by Clock Gating*, International Journal of Advancements in Technology, «http://ijict.org», vol. 4, No. 1, dated Mar. 2013, 10 pages.

Dhanwanda et al., *Efficient PVT Independent Abstraction of Large IP Blocks for Hierarchical Power Analysis*, IEEE, ICCAD '13, Proceedings of the International Conference on Computer-Aided Design, Publication Date: Nov. 18, 2013, 8 pages.

Dhanwanda et al., *Leakage Power Contributor Modeling*, EDA Industry Standards, IEEE Design & Test Computers, Mar./Apr. 2012, 8 pages.

Silvaco, *Introduction to Cell Characterization*, Digital CAD, 2012, printed Oct. 24, 2017, 73 pages.

Hathaway, *Power Contributor Modeling*, IBM Corporation, Silicon Integration Initiative, Si2 Conference, Oct. 20, 2011, 23 pages.

FIS920150033US02, Appendix P; List of IBM Patent or Application Treated as Related, Aug. 8, 2019, 2 pages.

* cited by examiner

METHODS FOR GENERATING A CONTRIBUTOR-BASED POWER ABSTRACT FOR A DEVICE

CROSS-REFERENCE TO RELATED APPLICATION

This application is a continuation application of and claims priority from U.S. patent application Ser. No. 14/788,859, filed on Jul. 1, 2015.

BACKGROUND

The present disclosure is generally related to data processing, or, more specifically, methods, apparatus, and products for generating a contributor-based power abstract for a device.

DESCRIPTION OF RELATED ART

As the complexity of electronic devices increase, the challenges in designing those devices increase accordingly. One of the difficulties in designing modern electronic devices is swift, accurate power modeling. Particularly as devices increase in complexity (e.g., by including design sub-blocks with multiple time domains), the design approaches for those devices should address that additional complexity.

SUMMARY

Methods, apparatuses, and computer program products for generating a contributor-based power abstract for a device are disclosed, including: identifying a clock power component for each of a plurality of clock gating domains, identifying a switching characteristic for each of the clock gating domains, combining the switching characteristics for all of the clock gating domains into a domain combination list, performing a per-case simulation based at least on the domain combination list, calculating an effective capacitance for each of the clock gating domains based at least on the per-case simulation, and generating a power abstract for each of the clock gating domains based at least on the effective capacitance.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

In some high frequency microprocessors, the clock signal may be a significant contributor to overall power consumption. Several techniques to reduce the power consumption may be used, and among these techniques, clock gating is common. Clock gating may be understood as a technique in which unused resources may be gated off to reduce active power without unduly impacting performance. For example, rather than communicating a clock signal to all sequential elements within a block regardless of whether or not they will toggle in the next clock cycle, the clock signals may be combined with explicitly predefined enabling signals, allowing sequential elements to be shut down. Clock gating may be used at several levels of design abstraction: system architecture, block design, logic design, gate level, etc.

However, aggressively clock gated designs may produce difficulties in accurately analyzing power on a full chip implementing such a design. Accurate full chip power analysis is an important step in the design of power efficient microprocessor and system-on-chip ("SoC") chips. For example, full chip power analysis is used is in the power sort process for determining product shipping frequencies. In this power sort process, chip power analysis may be executed iteratively several times under different product modes, configurations, voltages and temperatures. In this context, traditional power aware design flows, which are based on conventional PVT (Process, Voltage, and Temperature)-specific power models and analysis, may be nearly impossible to use.

Aggressively clock gated designs, which are workload sensitive, may therefore require new modes of analysis. The present disclosure illustrates certain methods, apparatuses, and computer program products for generating a contributor-based power abstract for a device, suited to improving the accuracy of power analyses for these aggressively clock gated designs. Particularly, the present disclosure includes generating a PVT-independent power abstract.

Figure 1:
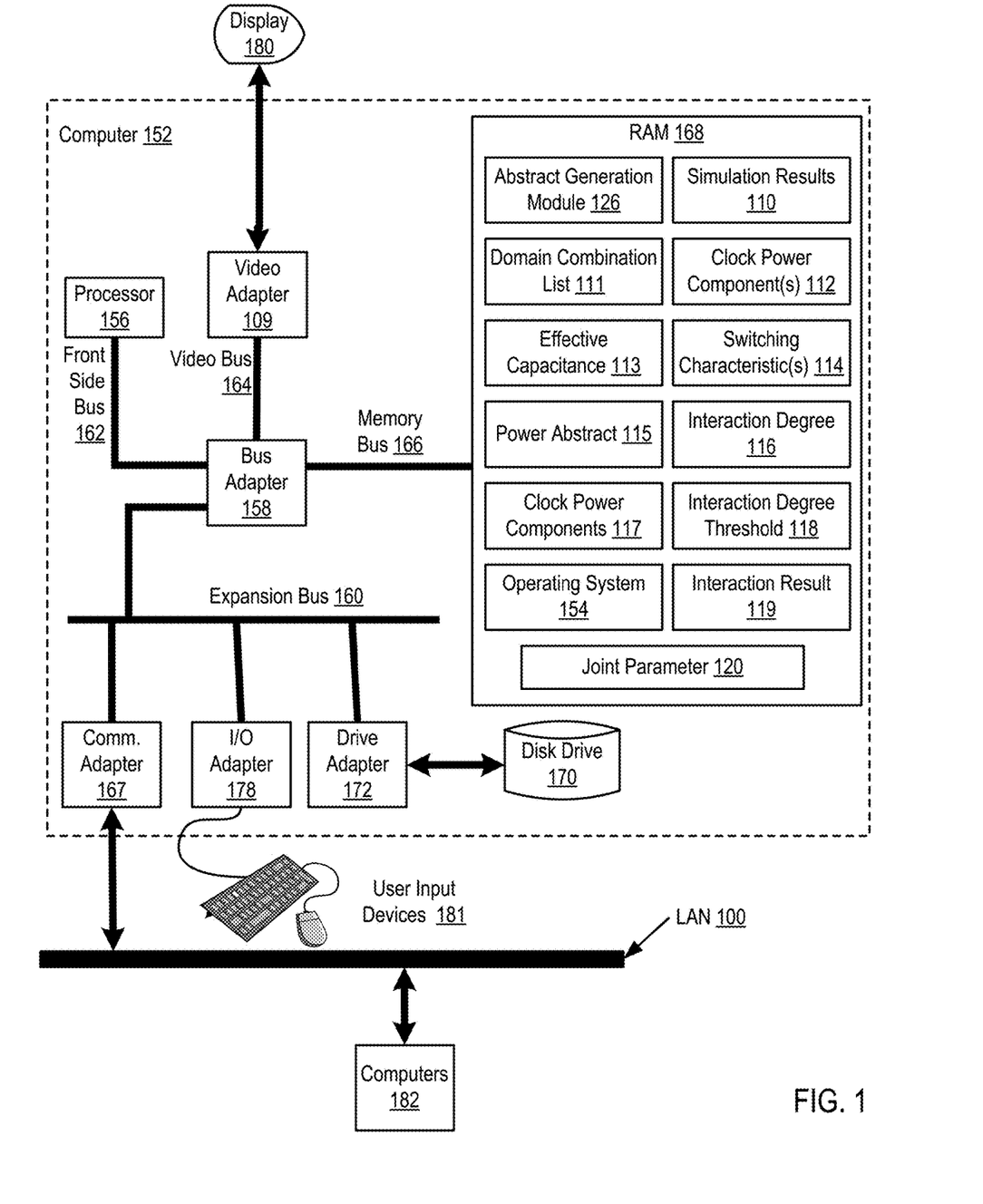
FIG. 1 sets forth a block diagram of automated computing machinery comprising an exemplary computer useful in generating a contributor-based power abstract for a device, in accordance with certain embodiments of the present disclosure.

Example methods, apparatus, and products for generating a contributor-based power abstract for a device in accordance with embodiments described herein with reference to the accompanying drawings, are described beginning with FIG. 1. FIG. 1 sets forth a block diagram of automated computing machinery comprising an exemplary computer (152) useful in generating a contributor-based power abstract for a device, in accordance with certain embodiments of the present disclosure. The computer (152) of FIG. 1 includes at least one computer processor (156) or "CPU" as well as random access memory (168) ("RAM") which is connected through a high speed memory bus (166) and bus adapter (158) to processor (156) and to other components of the computer (152).

Stored in RAM (168) is an abstract generation module (126), a module of computer program instructions for generating a contributor-based power abstract for a device. The module (126) of FIG. 2 may generate a contributor-based power abstract for a device by: identifying a clock power component associated with each of a plurality of clock gating domains within an block, identifying a switching characteristic for each of the plurality of clock gating domains, combining the switching characteristics for all of the plurality of clock gating domains into a domain combination list, the domain combination list is associated with a power consumption of logic within the block, performing a per-case simulation based at least on the domain combination list, calculating an effective capacitance for each of the plurality of clock gating domains based at least on the per-case simulation, and generating a power abstract for each of the plurality of clock gating domains based at least on the effective capacitance, as described in greater detail below.

Also stored in RAM (168) are various data elements and/or data structures operable to allow module (126) to generate a contributor-based power abstract for a device. As described in more detail below with reference to FIGS. 2-4, example data elements may include: simulation results (110), domain combination list (111), clock power component(s) (112), effective capacitance (113), switching characteristic(s) (114), power abstract (115), interaction degree (116), clock power component(s) (117), interaction degree threshold (118), interaction result (119), and/or joint parameter (120). Each of these elements is described in more detail below with reference to FIGS. 2-4.

In some embodiments, example data elements and/or data structures may include further data elements and/or data structures. Further, although certain example data elements are illustrated in FIG. 1 to aid in understanding, additional data elements and/or data structures may be implemented in some embodiments without departing from the scope of the present disclosure. For example, as described in more detail below with reference to FIG. 3, data stored at clock power components (112) may be derived from other data such as a clock gating domain trace, a unique clock gate control, a net mark, and any associated data that may be appropriate for generating this data.

Also stored in RAM (168) is an operating system (154). Operating systems useful for generating a contributor-based power abstract for a device according to embodiments described herein include UNIX™, Linux™, Microsoft XP™, AIX™, IBM's i5/OS™, and others as will occur to those of skill in the art. The operating system (154), and abstract generation module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for generating a contributor-based power abstract for a device according to embodiments described herein include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for generating a contributor-based power abstract for a device according to embodiments described herein include modems for wired dial-up communications, Ethernet (IEEE 802.3) adapters for wired data communications, and 802.11 adapters for wireless data communications.

Figure 2:
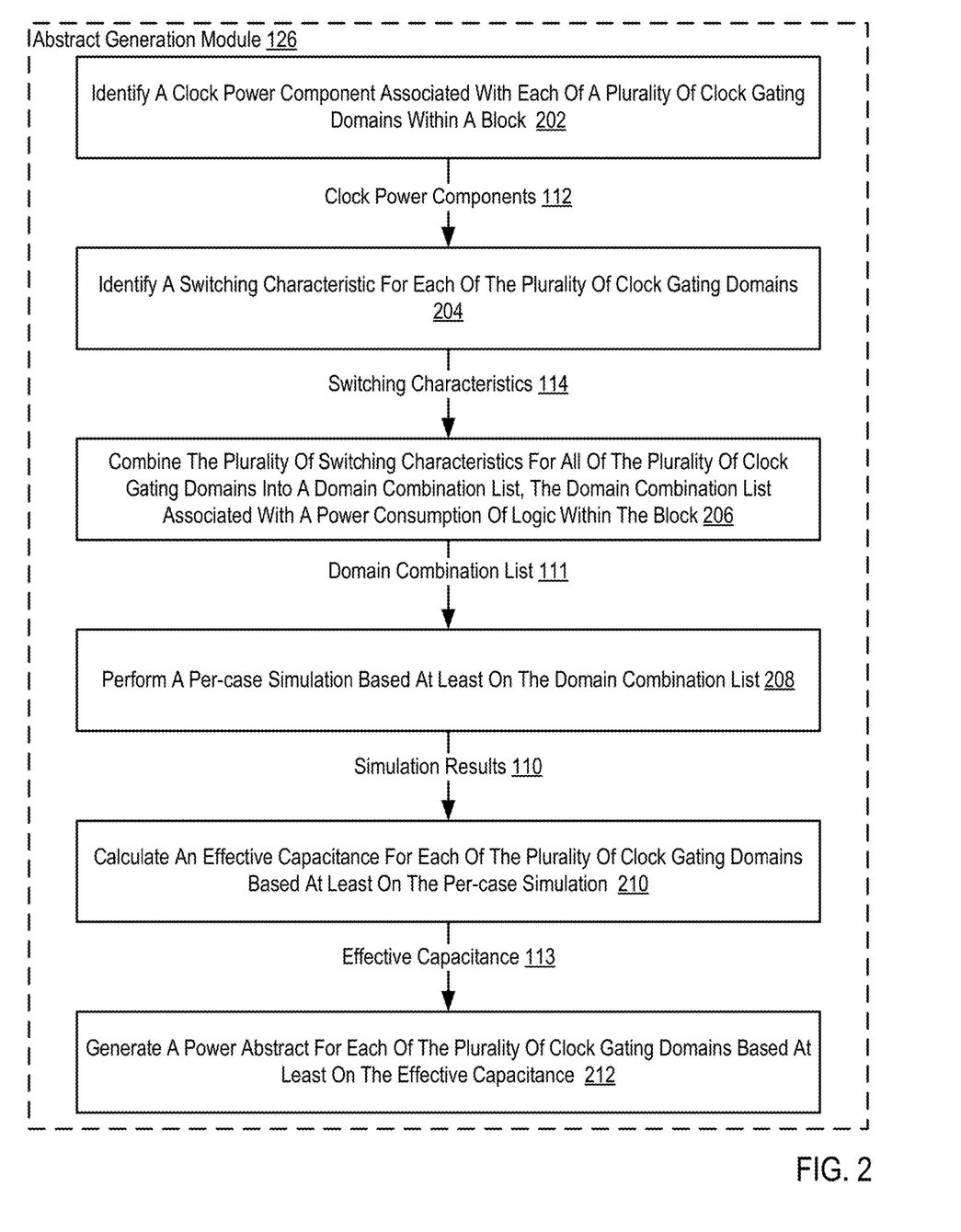
FIG. 2 sets forth a flow chart illustrating an exemplary method for generating a contributor-based power abstract for a device, in accordance with certain embodiments of the present disclosure.

For further explanation, FIG. 2 sets forth a flow chart illustrating an exemplary method for generating a contributor-based power abstract for a device, in accordance with certain embodiments of the present disclosure. A 'power abstract' as the term is used in this specification is a parameterized model of power consumption for a particular block of a larger system model. A block may also be referred to as a "macro" or an "IP block." As described in more detail above, certain prior power abstraction methods generate power abstracts that may be dependent on process, voltage, and temperature ("PVT") considerations. Further, certain prior power abstraction methods generate power abstracts that may depend on the workload of a particular block.

A "contributor-based" power abstract is a power abstract that relies for its parameterization on the modeling of power "contributors," or components of a block that contribute to the overall power consumption of a block. An example contributor-based power abstraction method is described in further detail in U.S. patent application Ser. No. 13/932,662. "Parameterization," as the term is used in this disclosure, is the modeling of a component or block through the use of parameters. For example, a component or block may be parameterized by identifying or calculating one or more values associated with an event such as a change in operating conditions. These events may be chosen to identify a plurality of operating conditions under which the component or block may operate. For example, as described in more detail below, a component or block may be parameterized according to a plurality of power events, with each event corresponding to different power conditions. The parameter value may be, for example, an effective capacitance under the particular power condition.

A contributor-based power abstract (hereinafter referred to simply as a "power abstract") may allow for more accurate capturing of highly nonlinear and variable power consumption across an entire process and operating space in a single model. This may allow for avoidance of re-characterizing power consumption of block components when underlying technology characteristics change. This may be accomplished, for example, by summing power contributors as functions rather than values in power model abstraction flows.

In some embodiments, a power abstract may be embodied as one or more data elements and/or data structures stored in RAM (168) of example computer (152). For example, power abstract (115) may be stored in RAM (168). As described in more detail below and with reference to FIGS. 3-4, power abstract (115) may be the result of the execution of instructions by processor (156) involving several other data elements and/or data structures. In some embodiments, these instructions may be stored for execution in abstract generation module (126). The example method of FIG. 2 illustrates processes whereby power abstract (115) may be generated.

The example method of FIG. 2 includes identifying (202) a clock power component (112) associated with each of a plurality of clock gating domains within a block. A "clock gating domain," as the term is used in this specification, is a portion of a block that shares a clock power component. A "clock power component," as the term is used in this specification, is any appropriate portion of a block that performs local functional clock gating. For example, identifying (202) a clock power component (112) associated with each of a plurality of clock gating domains within a block may include identifying one or more unique nets that drive the control pin of local clock buffers ("LCBs") that control the latch banks of the block. An LCB may be a circuit block that implements built-in clock adjustment controls to fine-tune the waveforms of the local clocks to the clocking elements. Identifying (202) a clock gating domain power component (112) associated with each of a plurality of clock gating domains within a block may also be referred to as "domain identification."

The example method of FIG. 2 also includes identifying (204) a switching characteristic (114) for each of the plurality of clock gating domains. A "switching characteristic," as the term is used in this specification, is any characteristic of a clock gating domain that identifies a switching route through the clock circuitry for that particular domain. For example, a switching characteristic may be a bit flag that has been set for each clock gating domain, wherein the bit flag is set to a particular value for a particular switching route. In some embodiments, domains that have an LCB controlled by a common clock gate may have the same switching characteristic, as described in more detail below with reference to FIG. 3. In some embodiments, the switching characteristic for each of the plurality of clock gating domains may be stored as one or more data elements and/or data structures in RAM (168) of example computer (152). For example, the bit flags may be stored at switching characteristics (114).

In some embodiments, as described in more detail below with reference to FIG. 3, identifying (204) a switching characteristic (114) for each of the plurality of clock gating domains may include: tracing each of the plurality of clock gating domains to identify a unique clock gate control, forward propagating a net mark (e.g., a bit flag) from a clock output net of a local clock buffer associated with one of the plurality of clock gating domains, and identifying the plurality of clock gating domains with the same net mark if the plurality of clock gating domains each comprise a local clock buffer controlled by a common clock gate. One advantage of separating the plurality of clock gating domains via switching characteristics (114) may be to preclude a need for separate simulation for each of the plurality of clock gating domains.

The example method illustrated in FIG. 2 also includes combining (206) the plurality of switching characteristics (114) for all of the plurality of clock gating domains into a domain combination list (111), the domain combination list is associated with a power consumption of logic within the block. A "domain combination list," as the term is used in this specification, is a combined identification of all the clock gating domains associated with a particular block. In contrast to a "power abstract" (or a "contributor-based power abstract"), a domain combination list is a combination of all of the previously identified and marked clock gating domains for further use in generating the power abstract. For example, a domain combination list may be a table listing each identified clock gating domain, along with any associated switching characteristics. A domain combination list may be created in order to abstract the power attributed to logic drive by multiple domains. In some embodiments, the domain switching list may be stored as one or more data elements and/or data structures in RAM (168) of example computer (152). For example, the domain combination list may be stored at domain combination list (111).

The example method of FIG. 2 also includes performing (208) a per-case simulation based at least on domain combination list (111). A "per-case simulation," as the term is used in this specification, is a power simulation in which a plurality of "cases" is defined, with the cases assigned different values for a plurality of simulation factors. For example, each case may be assigned a clock gating value (e.g., "0" for off, "1" for on), an input switch rate, and a latch output switch rate. In some embodiments, cases may be selected in order to characterize all or part of a block-level effective capacitance under particular settings (e.g., each of the control points of the design—the simulation factors described above). One or more random or pseudo-random simulation(s) may then be performed on each case. The result of these simulations ("simulation results") may be one or more block-level effective capacitance values, which may in turn be used in further power abstraction, as described in more detail below.

Performing (208) a per-case simulation based at least on domain combination list (111) includes performing per-case simulations on the combination of all identified clock gating domains. By performing per-case simulations based at least on domain combination list (111), the need for separate simulations per clock gating domain may be precluded. In some embodiments, the simulation results may be stored as one or more data elements and/or data structures in RAM (168) of example computer (152). For example, the simulation results may be stored at simulation results (110). In some embodiments, simulation results (110) may include a per-case effective capacitance (defined below) that may be used in per-domain effective capacitance calculation.

The example method illustrated in FIG. 2 also includes calculating (210) an effective capacitance (113) for each of the plurality of clock gating domains based at least on the per-case simulation. "Effective capacitance," as the term is used in this disclosure, is a value associated with the modeled capacitance of one or more components. For example, each of the plurality of clock gating domains of a block may have an associated effective capacitance. As an additional example, as described above, the block as a whole may have an associated effective capacitance. Other examples used in chip-level power analysis include effective capacitances associated with: a base power when clock gating is true and other activity factors are zero; additional power when clock gating is off, but not including any impact of the latch switching clocked by an ungated clock; power adders due to primary input and latch output switching; synergistic delta in power due to combined switching of primary inputs an latch outputs, and other appropriate "events" associated with power conditions.

Calculating (210) an effective capacitance (113) for each of the plurality of clock gating domains based at least on the per-case simulation includes an effective capacitance on a per-domain, rather than a per-case basis. Since the power contributor model of the present disclosure is an abstraction of the component whose power is being modeled, effective capacitance may encapsulate the effects of many physical capacitances and power dissipation due to short circuit currents. These physical capacitances typically will not switch at the same rate as the reference pin, and thus effective capacitance may or may not be equal to the sum of physical capacitances whose power impact is modeled by effective capacitance. In some embodiments, the effective capacitance may be stored as one or more data elements and/or data structures in RAM (168) of example computer (152). For example, the effective capacitance may be stored at effective capacitance (113).

The example method illustrated in FIG. 2 also includes generating (212) a power abstract (115) for each of the plurality of clock gating domains based at least on the effective capacitance (113). Generating (212) a power abstract (115) for each of the plurality of clock gating domains based at least on the effective capacitance (113) includes combining the per-case effective capacitance with the per-domain capacitance. For example, power contributors (e.g., per-domain elements) may be parameterized based on the domain(s) that drive the capacitance associated with that domain. This parameterization may then by mapped to an entry in domain combination list (111) for which per-domain effective capacitance was calculated.

For example, one type of modeled block-level effective capacitance value may be a latch output switch rate ("LOSF")-dependent effective capacitance ("LosfDepCeff"). Power contributors may parameterize the LosfDepCeff value for the domains that influence LosfDepCeff. During a chip-level power analysis, LOSF may be computed from the workload-driven switching activities, and a maximum LOSF among all domains that influence a common logic may be used for computing LosfDepCeff power. For example, if domain combination list (111) contains domains D1 and D2, then the activity events on which the element would be parameterized would reflect the domains' influence on LosfDepCeff (e.g., the parameterization would include a value reflective of D1's influence and a value reflective of D2's influence). A maximum may then be computed during chip-level power analysis, and may be used for computing the power modeled by this effective capacitance.

Parameterized values may then be combined into a power abstract for each of the plurality of clock gating domains. Although one example is provided in the discussion above, a power abstract may include more and/or different parameterized values without departing from the scope of the present disclosure. In some embodiments, the power abstract may be stored as one or more data elements and/or data structures in RAM (168) of example computer (152). For example, the power abstract may be stored at power abstract (115).

As described in more detail above, the example method of FIG. 2 may include identifying (204) a plurality of switching characteristics (114) for each of the plurality of clock gating domains. FIG. 3 illustrates an example method of identifying a plurality of switching characteristics (114) for each of the plurality of clock gating domains, in accordance with certain embodiments of the present disclosure.

In some embodiments, the example method illustrated in FIG. 2 may include performing a no-simulation, clock power only abstraction based at least on clock power components identified. For example, a logic designer may wish to see a very quick assessment of the impact of clock gating decisions before running a full simulation. In such a configuration, power abstract (115) may be generated solely from a per-domain parameterization. Such an abstraction may be similar to generating (212) a power abstract (115), as described in more detail above. However, in such configurations, no use would be made of per-case simulations, or of identifying (204) switching characteristics (114).

As described above, identifying (204) switching characteristics allows clock gating domains to be grouped and categorized, allowing for potential performance improvements. In some embodiments, switching characteristics may be embodied as one or more data elements and/or data structures stored in RAM (168) of example computer (152). For example, switching characteristics (114) may be stored in RAM (168). As described in more detail below, switching characteristics (114) may be the result of the execution of instructions by processor (156) involving several other data elements and/or data structures. In some embodiments, these instructions may be stored for execution in abstract generation module (126). The example method of FIG. 3 illustrates processes whereby switching characteristics (114) may be generated.

Figure 3:
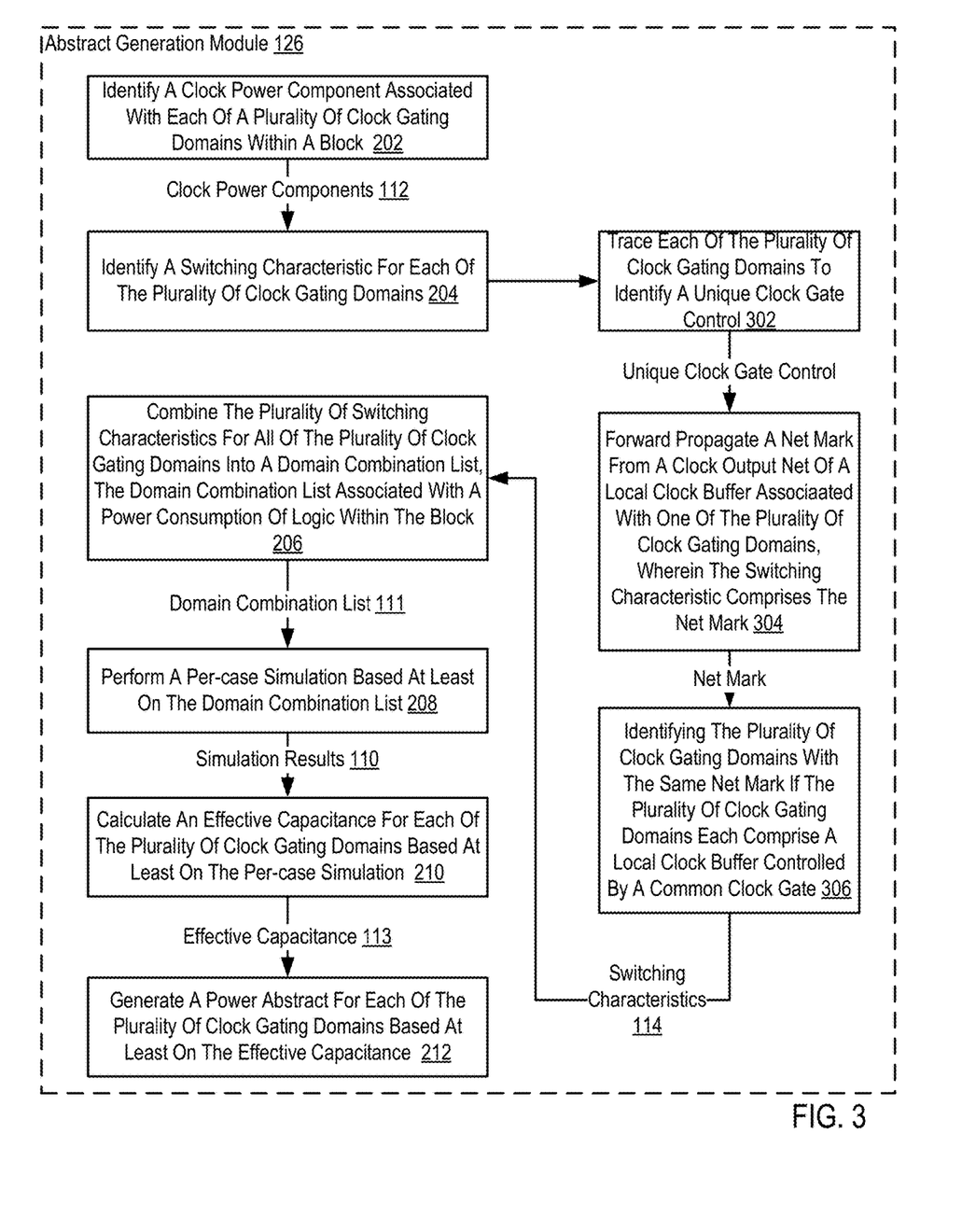
FIG. 3 illustrates an example method of identifying a plurality of switching characteristics for each of the plurality of clock gating domains, in accordance with certain embodiments of the present disclosure.

The example method illustrated in FIG. 3 includes for reference and to aid in understanding the example method illustrated in FIG. 2. The processes included in the example method illustrated in FIG. 3 should be understood to occur as part of identifying (204) a plurality of switching characteristics (114) for each of the plurality of clock gating domains.

The example method illustrated in FIG. 3 includes tracing (302) each of the plurality of clock gating domains to identify a unique clock gate control. For example, tracing (302) each of the plurality of clock gating domains to identify a unique clock gate control may include traversing a net list associated with a block (e.g., a complete interconnectivity description of a block) in order to identify domain information for each component of the net list. This may include tracing back from each clock gate (e.g., an LCB control pin input) through inverters and buffers to identify a unique clock gate control. A unique clock gate control may be understood to be any data value and/or data structure operable to identify the clock gate controlling the particular component. The data value and/or data structure may be referred to as a "net mark."

The example method illustrated in FIG. 3 also includes forward propagating (304) a net mark from a clock output net of a local clock buffer associated with one of the plurality of clock gating domains, wherein the switching characteristic comprises the net mark. This may include forward propagating separate net marks from the clock outputs of LCBs controlled by each of the identified clock gate controls. In some embodiments, the net mark may be a bit flag or other appropriate data value that may be propagated along a clock net.

The example method illustrated in FIG. 3 also includes identifying (306) the plurality of clock gating domains with the same net mark if each of the plurality of clock gating domains comprises a local clock buffer controlled by a common clock gate. This may include identifying the clock gate control for each LCB output and, if the LCB outputs are controlled by the same clock gate control, assigning the same net mark (e.g., bit flag) to the logic net sourced at that LCB output. In some embodiments, the net mark may be some or all of the data stored as switching characteristics (114).

In some embodiments, the traversal may continue through the remaining clock tree, into the clock pin of the latches, through combinational logic, and stop at the data inputs to the next latch. By traversing the net list and identifying switching characteristics (114) in this manner, advantages may be seen in handling relatively complex scenarios such as logic driven by multiple clock gating domains, feedback logic, etc.

As described in more detail above, the example method of FIG. 2 may include generating (212) a power abstract (115) for each of the plurality of clock gating domains based at least on the effective capacitance (212). In some embodiments, the size of power abstract (115) may be unwieldy for analysis or storage. It may thus be desirable to reduce the size of power abstract (115) in order to improve performance.

Figure 4:
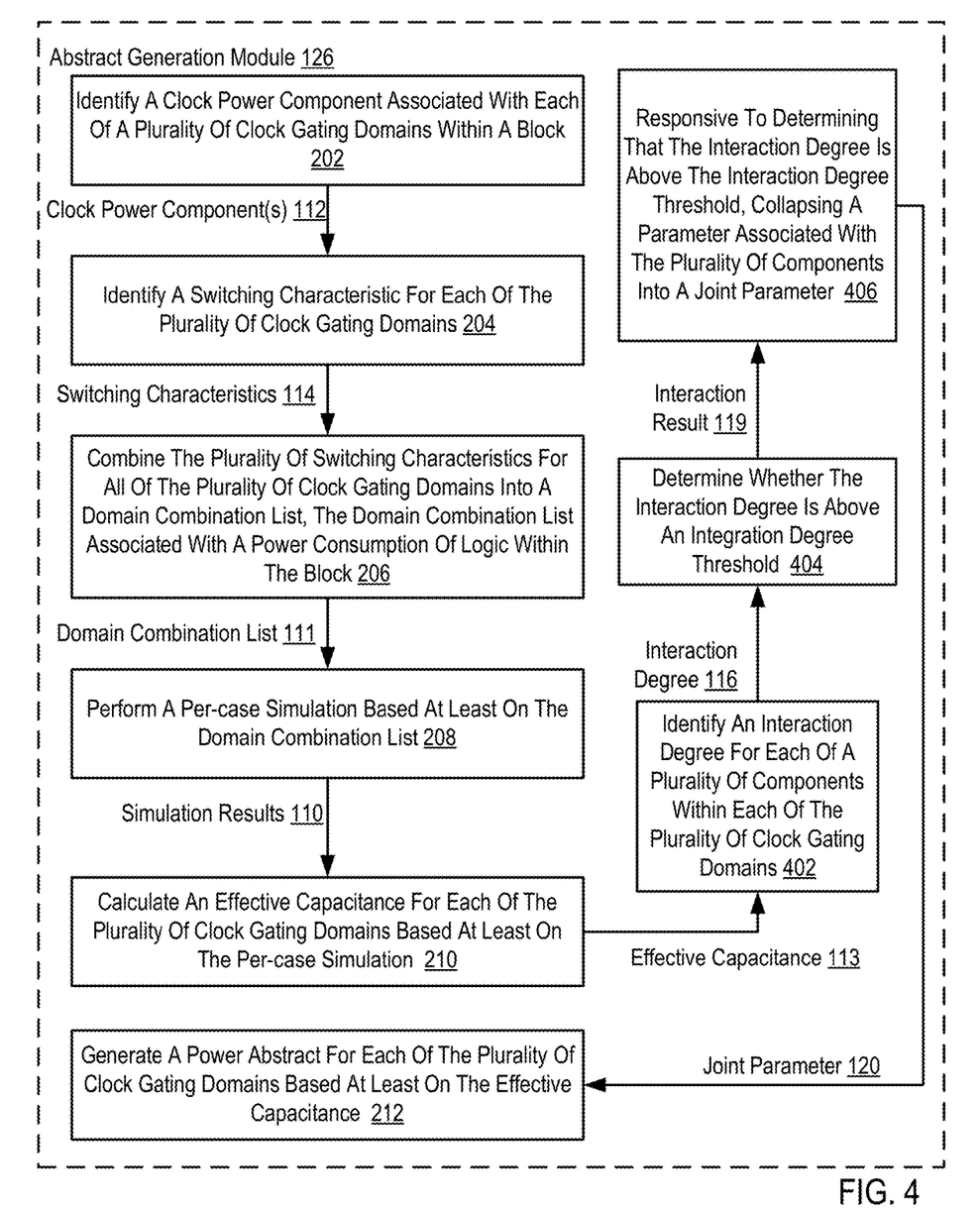
FIG. 4 illustrates an example method of collapsing all or a portion of power abstract in order to reduce the size of power abstract, in accordance with certain embodiments of the present disclosure.

FIG. 4 illustrates an example method of collapsing all or a portion of power abstract (115) in order to reduce the size of power abstract (115), in accordance with certain embodiments of the present disclosure. In some embodiments, a power abstract may be embodied as one or more data elements and/or data structures stored in RAM (168) of example computer (152). For example, power abstract (115) may be stored in RAM (168). As described in more detail below, power abstract (115) may be the result of the execution of instructions by processor (156) involving several other data elements and/or data structures. In some embodiments, these instructions may be stored for execution in abstract generation module (126).

The example method illustrated in FIG. 4 includes for reference and to aid in understanding the example method illustrated in FIG. 2. The processes included in the example method illustrated in FIG. 4 should be understood to occur as part of calculating (210) an effective capacitance for each of the plurality of clock gating domains based at least on the per-case simulation.

The example method illustrated in FIG. 4 includes identifying (402) an interaction degree (116) for each of a plurality of components within each of the plurality of clock gating domains. As described in more detail above with reference to FIGS. 1-3, each component of a clock gating domain may have one or more parameters associated therewith as a result of the power abstraction process. For example, one or more effective capacitance value(s) associated therewith.

Collapsing all or a portion of power abstract (115) takes advantage of an "interaction degree" between or among components of a clock gating domain. "Interaction degree," as used in this specification, is a value associated with a measure of interaction between or among clock gating domains based at least on one or more of the parameters associated with the component. For example, an interaction degree may be a difference between measured or calculated values for two different elements. As another example, an interaction degree may be the distance between a measured or calculated value and a predetermined threshold value. By taking advantage of interacting clock gating domains, some or all of power abstract (115) may be collapsed (e.g., by combining multiple parameterized clock gating domains into a single parameterized clock gating domain), thus reducing the size of power abstract (115).

In some embodiments, an effective capacitance value may be used as an integration degree. For example, the plurality of clock gating domains may be sorted by a particular parameterized value. In some configurations, this may an effective capacitance value such as LosfDepCeff. By calculating a percentage contribution of a given element to the total LosfDepCeff for the clock gating domain, candidates for merging may be identified.

The example method illustrated in FIG. 4 also includes determining (404) whether the interaction degree (116) is above an integration degree threshold (118). In some embodiments, integration degree threshold (118) may be a predetermined value operable to provide a cutoff for collapsing one or more parameterized elements into a single parameterized element. Using the example above, if a plurality of elements contribute a similar percentage contribution to the total LosfDepCeff for the clock gating domain (e.g., +/−0.1%), then the plurality of elements may be combined into a single parameterized element. In some embodiments, interaction degree (116) and/or interaction degree threshold (118) may be data values and/or data structures stored in RAM (168) of example computer (152).

The example method illustrated in FIG. 4 also includes responsive to determining that interaction degree (116) is above interaction degree threshold (118), collapsing (406) a parameter associated with the plurality of components into a joint parameter. As described in more detail above, if a plurality of components is within an acceptable range of interaction, they may be merged into a single parameterized component. While FIG. 4 illustrates this cutoff as being "above" interaction degree threshold (118), one of ordinary skill in the art would recognize other methods of comparison without departing from the scope of the present disclosure. In order to collapse the plurality of components into a single parameterized component, the respective parameters of the individual components would instead be represented by a joint parameter. This joint parameter may be any parameter appropriate for use in generating (212) a power abstract (115) for each of the plurality of clock gating domains, as described in more detail above with reference to FIGS. 1-3. For example, the joint parameter may be a joint LosfDepCeff value. In some embodiments, the joint parameter may be stored data values and/or data structures stored in RAM (168) of example computer (152), for example at joint parameter (120).

Apparatuses, methods, and computer program instructions for generating a contributor-based power abstract for a device are herein disclosed. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method for generating a contributor-based power abstract for a device, the method comprising:
    identifying a clock power component associated with each of a plurality of clock gating domains within a block;
    identifying a respective switching characteristic for each of the plurality of clock gating domains, including:
        tracing each of the plurality of clock gating domains to identify a unique clock gate control;
        forward propagating a net mark from a clock output net of a local clock buffer associated with one of the plurality of clock gating domains, wherein the switching characteristic comprises the net mark; and
        identifying the plurality of clock gating domains that have the same net mark, such that respective net marks in the respective switching characteristics of the plurality of clock gating domains are set to an identical value, when each clock gating domain comprises a local clock buffer controlled by a common clock gate;
    combining the switching characteristics for all of the plurality of clock gating domains into a domain combination list, the domain combination list associated with a power consumption of logic within the block;

performing a per-case simulation based at least on the domain combination list;

calculating an effective capacitance for each of the plurality of clock gating domains based at least on the per-case simulation, including combining two or more of a plurality of parameterized clock gating domains into a single parameterized clock gating domain; and generating a power abstract for each of the plurality of clock gating domains wherein a size of the power abstract is reduced based at least on the single parameterized clock gating domain and the effective capacitance.

2. The method of claim 1, further comprising, prior to generating the power abstract:

identifying an interaction degree for each of a plurality of components within each of the plurality of clock gating domains;

determining whether the interaction degree is above an interaction degree threshold; and responsive to determining that the interaction degree is above the interaction degree threshold, collapsing a parameter associated with the plurality of components into a joint parameter.

3. The method of claim 2, wherein the interaction degree comprises a latch output switch factor dependent AC element.

4. The method of claim 2, wherein the interaction degree threshold is associated with a total latch output dependent switching capacitance.

5. The method of claim 1, further comprising performing a no-simulation-based clock power only abstraction based at least on clock power components identified.

6. Apparatus for generating a contributor-based power abstract for a device, the apparatus comprising a computer processor, a computer memory operatively coupled to the computer processor, the computer memory having disposed within it computer program instructions capable of:

identifying a clock power component associated with each of a plurality of clock gating domains within a block;

identifying a respective switching characteristic for each of the plurality of clock gating domains, including:
tracing each of the plurality of clock gating domains to identify a unique clock gate control;
forward propagating a net mark from a clock output net of a local clock buffer associated with one of the plurality of clock gating domains, wherein the switching characteristic comprises the net mark; and
identifying the plurality of clock gating domains that have the same net mark, such that respective net marks in the respective switching characteristics of the plurality of clock gating domains are set to an identical value, when each clock gating domain comprises a local clock buffer controlled by a common clock gate;

combining the switching characteristics for all of the plurality of clock gating domains into a domain combination list, the domain combination list associated with a power consumption of logic within the block;

performing a per-case simulation based at least on the domain combination list;

calculating an effective capacitance for each of the plurality of clock gating domains based at least on the per-case simulation, including combining two or more of a plurality of parameterized clock gating domains into a single parameterized clock gating domain; and generating a power abstract for each of the plurality of clock gating domains, wherein a size of the power abstract is reduced based at least on the single parameterized clock gating domain and the effective capacitance.

7. The apparatus of claim 6, further comprising:

identifying an interaction degree for each of a plurality of components within each of the plurality of clock gating domains;

determining whether the interaction degree is above an interaction degree threshold; and responsive to determining that the interaction degree is above the interaction degree threshold, collapsing a parameter associated with the plurality of components into a joint parameter.

8. The apparatus of claim 7, wherein the interaction degree comprises a latch output switch factor dependent AC element.

9. The apparatus of claim 7, wherein the interaction degree threshold is associated with a total latch output dependent switching capacitance.

10. The apparatus of claim 7, further comprising performing a no-simulation-based clock power only abstraction based at least on clock power components identified.

11. A computer program product for generating a contributor-based power abstract for a device, the computer program product disposed upon a computer readable storage medium, the computer program product comprising computer program instructions capable, when executed, of causing a computer to carry out the steps of:

identifying a clock power component associated with each of a plurality of clock gating domains within a block;

identifying a respective switching characteristic for each of the plurality of clock gating domains, including:
tracing each of the plurality of clock gating domains to identify a unique clock gate control;
forward propagating a net mark from a clock output net of a local clock buffer associated with one of the plurality of clock gating domains, wherein the switching characteristic comprises the net mark; and
identifying the plurality of clock gating domains that have the same net mark, such that respective net marks in the respective switching characteristics of the plurality of clock gating domains are set to an identical value, when each clock gating domain comprises a local clock buffer controlled by a common clock gate;

combining the switching characteristics for all of the plurality of clock gating domains into a domain combination list, the domain combination list associated with a power consumption of logic within the block;

performing a per-case simulation based at least on the domain combination list;

calculating an effective capacitance for each of the plurality of clock gating domains based at least on the per-case simulation, including combining two or more of a plurality of parameterized clock gating domains into a single parameterized clock gating domain; and generating a power abstract for each of the plurality of clock gating domains, wherein a size of the power abstract is reduced based at least on the single parameterized clock gating domain and the effective capacitance.

12. The computer program product of claim 11, further comprising:
  identifying an interaction degree for each of a plurality of components within each of the plurality of clock gating domains;
  determining whether the interaction degree is above an interaction degree threshold; and
  responsive to determining that the interaction degree is above the interaction degree threshold, collapsing a parameter associated with the plurality of components into a joint parameter.

13. The computer program product of claim 12, wherein the interaction degree comprises a latch output switch factor dependent AC element.

14. The computer program product of claim 12, wherein the interaction degree threshold is associated with a total latch output dependent switching capacitance.

15. The computer program product of claim 11, further comprising performing a no-simulation-based clock power only abstraction based at least on clock power components identified.

16. The computer program product of claim 11 wherein the computer readable storage medium comprises a recordable medium.

17. The computer program product of claim 11 wherein the computer readable storage medium comprises a transmission medium.

* * * * *